United States Patent [19]

Marvin

[11] 4,148,112
[45] Apr. 10, 1979

[54] HYDRAULIC EVISCERATION OF MOLLUSKS

[75] Inventor: John Marvin, Newcomb, Md.

[73] Assignee: The American Original Corporation, Seaford, Del.

[21] Appl. No.: 837,183

[22] Filed: Sep. 28, 1977

[51] Int. Cl.² ............................................. A22C 29/04
[52] U.S. Cl. ........................................... 17/53; 17/51
[58] Field of Search .................. 17/53, 51, 65, 48, 74; 83/53, 177

[56] References Cited

U.S. PATENT DOCUMENTS

| | | | |
|---|---|---|---|
| 3,156,948 | 11/1964 | Polito | 17/53 X |
| 3,309,731 | 3/1967 | Stephenson | 17/51 |
| 3,408,686 | 11/1968 | Stephenson | 17/51 X |
| 3,562,855 | 2/1971 | Willis | 17/48 |

*Primary Examiner*—Frank T. Yost
*Attorney, Agent, or Firm*—Schuyler, Birch, Swindler, McKie & Beckett

[57] ABSTRACT

The "bellies" of mollusk such as clams are removed from the remainder of the clam meat by introducing one whole clam body at a time into a fluid shearing zone where a separately introduced high velocity stream of fluid serves to shear the belly from the clam meat. Apparatus for carrying out this method is also disclosed.

10 Claims, 2 Drawing Figures

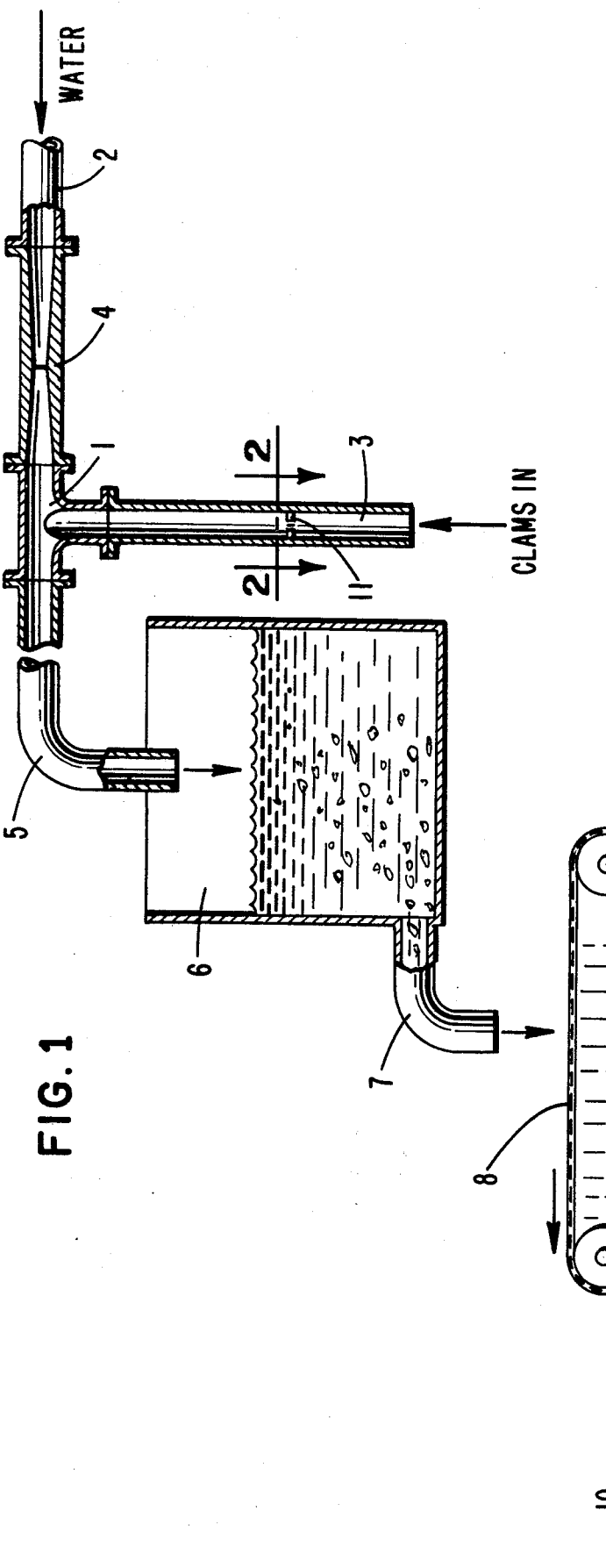
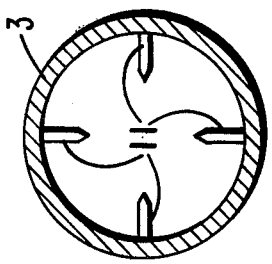

HYDRAULIC EVISCERATION OF MOLLUSKS

BACKGROUND OF THE INVENTION

1. Field of the Invention

This invention relates to the evisceration of marine mollusks such as clams wherein the "belly" of the clam is removed from the remaining clam meat.

2. Description of the Prior Art

The "belly" or viscera-containing portion of marine mollusks such as clams is conventionally removed from shucked clam bodies prior to the utilization of this specie in the preparation of food products. The belly portion is not only undesirable from a taste standpoint but also causes discoloration of the remaining meat during processing. In most commercial operations the debellying step traditionally has been carried out by hand. This is an expensive and time consuming process. More recently, there have been a number of attempts to develop apparatus for the mechanical debellying of clams.

One example of such an attempt at mechanical debellying is shown in Carlson, U.S. Pat. No. 3,688,344. In Carlson, whole clams are propelled by fluid stream against an impact surface whereby the impact allegedly results in separation of the belly from the remainder of the clam meat. The violent impact of the Carlson apparatus, however, is not particularly efficient and results in unnecessary structural damage to the remaining clam meat.

Debellying by subjecting clam meat slurries to lengthy agitation processes is disclosed in Finley, U.S. Pat. No. 3,659,315, Finley, U.S. Pat. No. 3,794,746, and Snow, U.S. Pat. No. 3,964,131. These agitation methods, however, are time consuming and require complicated and expensive equipment.

The problems of the prior art are accentuated by the present necessity of utilizing ocean quahog clams for food products. This previously unused species has a thick belly membrane surrounding the viscera which mades the debellying operation more difficult.

Thus, it would be of great value to the clam industry to provide a method and apparatus for the debellying of clams, including ocean quahogs, which was rapid and highly efficient and which employed relatively simple apparatus with few moving parts.

SUMMARY OF THE INVENTION

It is, therefore, an object of the present invention to provide a method and apparatus for the quick and efficient separation of clam bellies from the remainder of the clam meat which does not suffer from the drawbacks of the prior art.

More specifically, it is an object of the present invention to provide a process and apparatus in which substantially all the clam bellies are removed from the whole clam bodies without any structural damage to the remaining clam meat.

It is a further object of the present invention to provide a method and apparatus for debellying clams which is useful for all species of clams including the difficult to process ocean quahog.

In accordance with this invention, there is provided a method for separating the belly of a clam from the remainder of the clam meat comprising steps of sequentially introducing one whole clam body at a time to a fluid shearing zone, continuously introducing a high velocity stream of fluid into the shearing zone, the high velocity stream of fluid creating forces sufficient to shear the bellies from the whole clam bodies and separately recovering the sheared off bellies and the remainder of the clam meats.

The present invention also provides an apparatus for separating the belly of a clam from the remainder of the clam meat comprising means defining a fluid shearing zone, means for sequentially introducing one whole clam body at a time into the fluid shearing zone, means for continuously introducing a high velocity stream of fluid into the shearing zone to shear the bellies from the whole clam bodies, and means for separately recovering the sheared off bellies and the remainder of the clam meat.

BRIEF DESCRIPTION OF THE DRAWING

FIG. 1 is a schematic flow drawing of the process of the present invention.

FIG. 2 is a sectional view taken along line 2—2 of FIG. 1 showing the details of the slitting means.

DETAILED DESCRIPTION OF THE INVENTION

The process and apparatus of the present invention are useful for the extraction of bellies from marine mollusks such as clams, and are particularly well suited for difficult to process clam species such as the ocean quahog.

The process and apparatus of the present invention will now be described with reference to the drawings. The debellying operation takes place in a fluid shearing zone 1 which is formed at the intersection of the high velocity fluid conduit 2 and the clam introduction conduit 3. In the preferred construction this intersection comprises a "T" arrangement wherein the fluid conduit and clam introduction conduit intersect at substantially right angles.

The high velocity fluid conduit is connected to a source of fluid under pressure not shown. In the preferred embodiment this fluid is water. Other liquid or gases such as air also can be employed. The velocity of the fluid stream entering the fluid shearing zone can be increased by the use of a restricted flow mechanism 4 such as a venturi nozzle.

The high velocity fluid flow past the clam introduction conduit results in an aspiration or vacuum effect which draws the whole clam bodies up the conduit and into the fluid shearing zone. It is essential to the operation of the present method and apparatus to ensure that whole clam bodies are introduced into the fluid shearing zone one at a time. This can be best accomplished by providing a clam introduction conduit of a diameter such that the whole clam bodies are aspirated up the conduit in single file.

It is the action of the high velocity fluid jet impinging upon a single whole clam body as it enters the shearing zone that effects the debellying of the present invention. The forces created by the fluid jet shear the belly from the remaining clam meat. The separated components in the fluid stream are carried out of the shearing zone by discharge conduit 5. Unless the clam bodies are introduced into the shearing zone one at a time, high velocity fluid will not be effective to debelly substantially all of the clam bodies fed to the zone.

The fluid conduit 2 should be adapted to provide a fluid stream with sufficient velocity to shear the belly from the remaining clam meat. In general, fluid velocities of at least about 10,000 feet per minute are satisfactory to accomplish this result. As will be recognized, the requisite velocity will depend somewhat on the species of clam being processed. The upper limit on the fluid velocity is primarily a function of the particular apparatus employed, although some structural damage to the debellied clam meat may occur if the fluid velocity is too high. In practice, velocities in the range of about 10,000 to 20,000 feet per minute have been satisfactorily employed. Preferred are velocities in the range of about 12,500 to 17,000 feet per minute. The requisite velocities may be achieved by delivering the fluid under sufficient pressure or by accelerating the pressurized fluid flow with a nozzle.

The mixture of clam bellies and debellied clam meats in the shearing fluid are discharged from conduit 5 into a collection tank 6. The solid components settle by gravity and flow via discharge 7 onto perforated conveyor 8. The conveyor effects a screening operation whereby the small belly particles fall through the conveyor into collection zone 9 whereas the larger clam meat portions are retained on the conveyor and forwarded to collection zone 10. Means to vibrate the conveyor screen can be provided in a known manner.

In the preferred embodiment of the present invention as best shown in FIG. 2, a special clam introduction conduit is employed to facilitate the debellying of ocean quahog clams. The ocean quahog clam is a smaller clam with a thick peritoneum enclosing the belly cavity. In order to facilitate the debellying of this particular species, the clam introduction conduit is provided with a plurality of knife-like projections 11 radially spaced about the tube to effect a slitting of the peritoneum. While this action does not remove the belly it loosens the hold of the belly skin and allows the high velocity fluid stream to effect debellying in the fluid shearing zone as described above.

The following example is included for illustrative purposes only and is not intended to limit the scope of the invention.

EXAMPLE

Ocean quahog clams were supplied through a 1½" introduction conduit to the apparatus shown in FIG. 1 at a rate of about 2,700 pounds per hour. Water under pressure was supplied to a 2" high velocity fluid conduit at a pressure of about 124 psig resulting in a fluid velocity through the ⅝" venturi nozzle of about 12,564 feet per minute. The resulting mixture of bellies, clam meat and water was discharged into the holding tank and the solids portion obtained from the bottom of the tank was subjected to a screening operation on a vibrating conveyor screen. The small belly portions passed through the screen whereas the remaining clam meats did not. During the course of this operation over 99% of the clam meat portions examined were found to be free of any belly material and to have sufficient structural integrity to allow their use in all types of clam food products.

While certain specific embodiments of the invention have been described with particularity herein, it should be recognized that various modifications thereof will occur to those skilled in the art. Therefore, the scope of this invention is to be limited solely by the scope of the claims appended thereto.

I claim:

1. A method for separating the belly of a clam from the remainder of the clam meat comprising the steps sequentially introducing one whole clam body at a time to a fluid shearing zone by providing a clam introduction conduit having a diameter such that said whole clam bodies can only pass through said conduit in a single file stream, continuously introducing a high velocity stream of fluid into said fluid shearing zone in such a manner that said whole clam bodies are aspirated into said fluid shearing zone by the vacuum created by said high velocity stream of fluid flowing past the point where said clam introduction conduit enters said fluid shearing zone, said high velocity stream of fluid creating forces sufficient to shear the bellies from said whole clam bodies, and separately recovering the bellies and the remainder of said clam meat.

2. The method of claim 1 additionally comprising the steps of passing said whole clam bodies through means for slitting the clam peritoneum disposed in said clam introduction conduit.

3. The method of claim 1 wherein said high velocity stream of fluid is passed through an area of reduced flow volume to accelerate said stream as it enters said fluid shearing zone.

4. The method of claim 1 wherein said high velocity stream of fluid is introduced into said fluid shearing zone at substantially right angles to the introduction of said whole clam bodies.

5. The method of claim 1 wherein the mixture of clam bellies and debellied clam meat discharged from said fluid shearing zone are separately recovered by passing said mixture over a vibrating screen through which said clam bellies will pass but on which said debellied clam meat will be retained.

6. An apparatus for separating the belly of a clam from the remainder of the clam meat comprising means defining a fluid shearing zone; means for sequentially introducing one whole clam body at a time into said fluid shearing zone, said means for introducing comprising a clam introduction conduit having a diameter such that whole clam bodies can only pass through said conduit in a single file stream; slitting means disposed in said clam introduction conduit inlet whereby the peritoneum of said whole clam bodies are slit as they pass through said conduit, means for continuously introducing a high velocity stream of fluid into said fluid shearing zone to shear said bellies from said whole clam bodies; and means for separately recovering the bellies and the remainder of said clam meat.

7. The apparatus of claim 6 wherein said means defining a fluid shearing zone comprises the intersection of said clam introduction conduit and a high velocity fluid conduit.

8. The apparatus of claim 7 wherein said clam introduction conduit and said high velocity fluid conduit intersect substantially at right angles.

9. The apparatus of claim 7 wherein said high velocity fluid conduit contains means for accelerating the velocity of said fluid stream disposed at the entrance to said fluid shearing zone.

10. The apparatus of claim 6 wherein said means for separately recovering the bellies and the remainder of said clam meat comprises a vibrating screen through which said clam bellies will pass but on which said debellied clam meat will be retained.

* * * * *